United States Patent [19]

Yamauchi et al.

[11] Patent Number: 5,437,688
[45] Date of Patent: Aug. 1, 1995

[54] GRANULAR REACTIVE DYE COMPOSITION AND PRODUCTION PROCESS THEREOF

[75] Inventors: Noriaki Yamauchi, Hirakata; Nobuaki Kawamura, Takarazuka; Tatuo Miura; Shuhei Hashizume, both of Osaka; Isao Nakamae, Hirakata; Kazumi Yoshigoe, Nishinomiya; Hiroyuki Suzuki, Habikino; Iwao Minami, Osaka, all of Japan

[73] Assignee: Sumitomo Chemical Company, Limited, Osaka, Japan

[21] Appl. No.: 165,867

[22] Filed: Dec. 14, 1993

Related U.S. Application Data

[63] Continuation of Ser. No. 772,783, Oct. 8, 1991, abandoned.

[30] Foreign Application Priority Data

Oct. 9, 1990 [JP] Japan .................................. 2-271302
Jul. 23, 1991 [JP] Japan .................................. 3-182363

[51] Int. Cl.⁶ .................... C09B 62/02; C09B 62/503; C09B 67/24
[52] U.S. Cl. ........................................ 8/526; 8/524; 8/583; 8/543; 8/549
[58] Field of Search ................... 8/524, 526, 543, 549, 8/581, 582, 583

[56] References Cited

U.S. PATENT DOCUMENTS

| | | | |
|---|---|---|---|
| 3,864,077 | 2/1975 | Popp et al. ................. | 8/583 |
| 3,948,599 | 4/1976 | Irmiger et al. .............. | 8/526 |
| 4,177,082 | 12/1979 | Robertson ..................... | 106/309 |
| 4,351,640 | 9/1982 | Schaffer et al. ............. | 8/524 |
| 4,540,418 | 9/1985 | Otake et al. ................. | 8/524 |
| 4,548,612 | 10/1985 | Kayane et al. .............. | 8/524 |
| 4,832,700 | 5/1989 | Kaspar et al. ............... | 23/313 EB |

FOREIGN PATENT DOCUMENTS

| | | |
|---|---|---|
| 0024654 | 3/1981 | European Pat. Off. . |
| 56975 | 8/1982 | European Pat. Off. . |
| 2540355 | 3/1976 | Germany . |
| 57-137361 | 8/1982 | Japan . |
| 58-125757 | 7/1983 | Japan . |
| 693765 | 7/1953 | United Kingdom . |
| 1431881 | 4/1976 | United Kingdom . |
| 2113112 | 8/1983 | United Kingdom . |

OTHER PUBLICATIONS

Patent Abstracts of Japan, vol. 7, No. 235 (C-191), 19 Oct. 1983 & JP-58 125 757 (Sumitomo), 26 Jul. 1983.
Patent Abstracts of Japan, vol. 6, No. 235 (C-136), 20 Nov. 1982 & JP-57 137 361 (Sumitomo), 24 Aug. 1982.

*Primary Examiner*—Paul Lieberman
*Assistant Examiner*—Margaret Einsmann
*Attorney, Agent, or Firm*—Stevens, Davis, Miller & Mosher

[57] ABSTRACT

A granular reactive dye composition comprising a water-soluble reactive dye and at least one granulating auxiliary agent selected from the group consisting of compounds of the following formula (3),

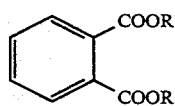

(3)

wherein R is $-C_sH_{2s+1}$, in which s is an integer of 5 to 20 and wherein the content of the granulating auxiliary agent is 5 parts by weight or less per 100 parts by weight of the reactive dye.

12 Claims, No Drawings

GRANULAR REACTIVE DYE COMPOSITION AND PRODUCTION PROCESS THEREOF

This application is a continuation of application Ser. No. 07/772,783, filed Oct. 8, 1991, now abandoned.

The present invention relates to a granular reactive dye composition and to a process for producing the granular composition.

Reactive dyes have been largely used for dyeing cellulose fibers, because of their excellent dyeing characteristics. However, in case of reactive dye products of powdery form, dusting takes place which is undesirable from the viewpoint of handling and environmental pollution.

As a method for solving such a problem, there has been carried out a method which comprises adding a small quantity of a mineral oil or a mineral oil emulsion as anti-dusting agents in the final step of the manufacture of the dye, thereby suppressing the dust formation. However, the method has a fault that the anti-dusting effect gradually decreases during storage of the dye products, and the dusting property reaches a considerable level when a half year or one year has passed. Further, even if the dust formation can be prevented by adding the anti-dusting agents, it much deteriorates fluidity of the dye products so that the dye products are not applicable to automatic weighing and dispensing systems recently developed in many dye houses.

Further, the reactive dye products are in general poor in compatibility with water at the time of dissolving them in water, and therefore its dissolution procedure takes a long period of time and a skillful technique is required for obtaining a clear dye solution.

On the other hand, granulation of reactive dyes is known as a means for suppressing the dusting property and achieving a good fluidity. However, granular reactive dye products formed in a usual manner are low in mechanical strength and abrasion resistance of granule. Thus, breakage of the granular products takes place in the course of transportation and handling and often causes dusting.

An aqueous liquid product of reactive dyes are also known to be improved in their water-dissolution property while preventing the dusting and maintaining a good fluidity. However, the aqueous liquid products have a problem in their storage stability. The problem is such that deposition of crystals of dyes and/or inorganic salts takes place during storage at low temperatures or a decomposition of dye takes place during storage at high temperatures to cause a discoloration or a decrease in color yield. Furthermore, a liquid product of sufficiently high concentration of the dye cannot be obtained and all the reactive dyes cannot be always formed into liquid products, because of their solubility in water.

An object of the present invention is to provide a granular reactive dye composition which is low in dusting property, high in particle strength enough to resist usual handlings and transportations, and excellent in fluidity and water-dissolution property.

Another object of the present invention is to provide a process for producing the granular reactive dye composition with industrial advantages.

The present invention provides a granular reactive dye composition, which comprises a reactive dye and at least one member selected from the group consisting of the following granulating auxiliary agents (a) to (d), (a) turkey red oil,
(b) a compound represented by the following formula (1),

$$C_mH_{2m+1}COOC_nH_{2n+1} \quad (1)$$

wherein m represents a number of 10 to 24, and n represents a number of 1 to 18;

(c) a compound represented by the following formula (2),

$$C_mH_{2m-1}COOC_nH_{2n+1} \quad (2)$$

wherein m and n are as defined above;

(d) a compound represented by the following formula (3),

(3)

wherein R represents $-C_sH_{2s+1}$, wherein s represents a number of 5 to 20.

The present invention also provides a process for producing the granular reactive dye composition, which comprises subjecting an aqueous composition comprising a reactive dye and at least one above-defined granulating auxiliary agent to drying granulation, or granulating a reactive dye in a powdery form using water or a binder, and spraying an aqueous solution or suspension of at least one above-defined granulating auxiliary agent to the formed granules while subjecting the granules to drying, whereby the granulating auxiliary agent adheres to the granule.

According to the process of the present invention, the reactive dye can be formed into granule or grain, and therefore in the present invention, the term "granule" includes grain as well as granule.

The reactive dye to be used in the present invention has at least one fiber-reactive group in one dye molecule.

The term "fiber-reactive group" used herein is intended to mean a group which reacts with —OH or —NH— group of fiber to form a covalent bond under the dyeing conditions.

Such fiber-reactive groups are mentioned in, for example, Sadaharu Abeta, Kunihiko Imada: "Kaisetsu Senryo Kagaku (Explanatory Dye Chemistry)", Shikisensha, Oct. 20 (1989), pp. 164–267.

As examples of the reactive dye, those having, in one molecule, at least one fiber-reactive group of the type of pyridine, pyridazine, pyridazone, pyrimidine, s-triazine, quinoline, quinoxaline, quinazoline, phthalazine, benzene, saturated alkanemonocarboxylic acid amides, alkenemonocarbamides, alkenedicarboxyamides, vinyl sulfamide, β-saturated ethyl sulfone or vinyl sulfone can be referred to.

Among these reactive dyes, particularly preferable are those having at least one, preferably one to three, fiber-reactive group(s) represented by the following formula (I) or (II):

$$-SO_2CH=CH_2 \quad (I)$$

$$-SO_2CH_2CH_2Z \quad (II)$$

wherein Z represents a group capable of being split by the action of an alkali.

More specifically, reactive dyes represented by the following formula (III) or (IV) are particularly preferably used:

$$D_1-(Y_1)_p \qquad (III)$$

wherein $D_1$ represents an organic dye residue having a sulfo group, $Y_1$ represents $-SO_2CH=CH_2$ or $-SO_2CH_2CH_2Z_1$ in which $Z_1$ represents a group capable of being split by the action of an alkali, and p represents a number of 1–3;

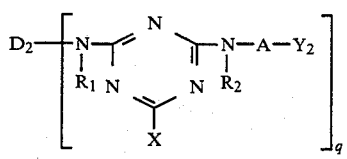
(IV)

wherein $D_2$ represents an organic dye residue having a sulfo group, $R_1$ and $R_2$ represent, independently of each other, a hydrogen or optionally substituted alkyl, A represents an optionally substituted phenylene or naphthylene, X represents a halogen, an optionally substituted pyridinio or a group of the following formula:

in which $R_4$ and $R_5$ represent, independently of each other, a hydrogen or an optionally substituted alkyl, phenyl, benzyl or naphthyl, $Y_2$ represents $-SO_2CH=CH_2$ or $-SO_2CH_2CH_2Z_2$ in which $Z_2$ represents a group capable of being split by the action of an alkali, and q represents a number of 1–3.

As examples of the group capable of being split by the action of an alkali represented by Z, $Z_1$ and $Z_2$, sulfuric ester group, thiosulfuric ester group, phosphoric ester group, acetic ester group, halogen atom and the like can be referred to. Among them, sulfuric ester group is particularly preferable.

As examples of the organic dye residue represented by $D_1$ and $D_2$ in the formulas (III) and (IV), there can be referred to the residues of monoazo dyes, polyazo dyes such as disazo dye and the like, metal complex monoazo or disazo dyes, metal formazan dyes, anthraquinone dyes, metal phthalocyanine dyes, stilbene dyes, oxazine dyes, dioxazine dyes, triphenylmethane dyes, phenazine dyes, xanthene dyes, thioxanthene dyes, naphthoquinone dyes, pyrenequinone dyes, perylenetetracarboimide dyes, nitro dyes and azomethine dyes. As the central atom of the metal complex, metal formazan and metal phthalocyanine dyes, Cu, Cr, Co, Ni, Fe and the like can be referred to.

As preferable examples of the phenylene and naphthylene groups represented by A in the formula (IV), phenylene groups optionally substituted once or twice by methyl, ethyl, methoxy, ethoxy, chloro, bromo or sulfo and naphthylene groups optionally substituted once by sulfo can be referred to. Their examples include the followings:

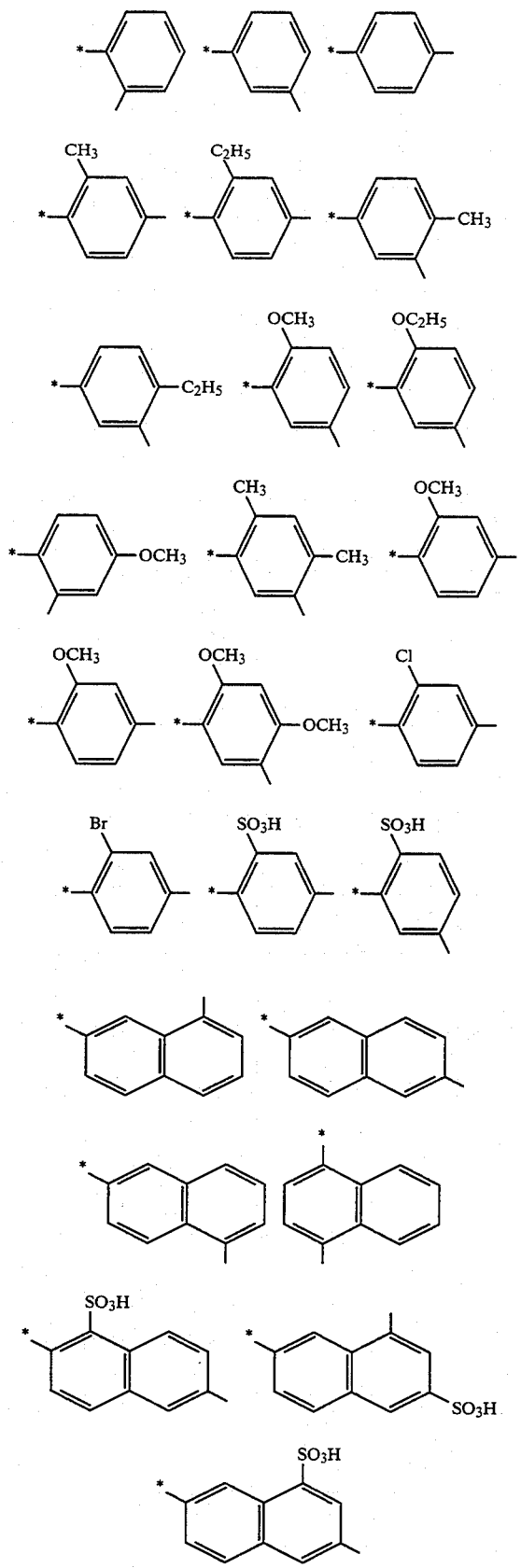

In these formulas, the mark * represents a bond linking to

As the alkyl group represented by $R_1$ and $R_2$, alkyl groups having 1–4 carbon atoms are preferable. As the substituent, hydroxy, cyano, alkoxy, halo, carboxy, carbamoyl, alkoxycarbonyl, alkylcarbonyloxy, sulfo, sulfamoyl and the like are preferable. Particularly preferable examples of $R_1$ and $R_2$ include hydrogen, methyl, ethyl, n-propyl, iso-propyl, n-butyl, iso-butyl, sec-butyl, 2-hydroxyethyl, 2-hydroxypropyl, 3-hydroxypropyl, 2-hydroxybutyl, 3-hydroxybutyl, 4-hydroxybutyl, 2,3-dihydroxypropyl, 3,4-dihydroxybutyl, cyanomethyl, 2-cyanoethyl, 3-cyanopropyl, methoxymethyl, ethoxymethyl, 2-methoxyethyl, 2-ethoxyethyl, 3-methoxypropyl, 3-ethoxypropyl, 2-hydroxy-3-methoxypropyl, chloromethyl, bromomethyl, 2-chloroethyl, 2-bromoethyl, 3-chloropropyl, 3-bromopropyl, 4-chlorobutyl, 4-bromobutyl, carboxymethyl, 2-carboxyethyl, 3-carboxypropyl, 4-carboxybutyl, 1,2-dicarboxyethyl, carbamoylmethyl, 2-carbamoylethyl, 3-carbamoylpropyl, 4-carbamoylbutyl, methoxycarbonylmethyl, ethoxycarbonylmethyl, 2-methoxycarbonylethyl, 2-ethoxycarbonylethyl, 3-methoxycarbonylpropyl, 3-ethoxycarbonylpropyl, 4-methoxycarbonylbutyl, 4-ethoxycarbonylbutyl, methylcarbonyloxymethyl, ethylcarbonyloxymethyl, 2-methylcarbonyloxyethyl, 2-ethylcarbonyloxyethyl, 3-methylcarbonyloxypropyl, 3-ethylcarbonyloxypropyl, 4-methylcarbonyloxybutyl, 4-ethylcarbonyloxybutyl, sulfomethyl, 2-sulfoethyl, 3-sulfopropyl, 4-sulfobutyl, sulfamoylmethyl, 2-sulfamoylethyl, 3-sulfamoylpropyl, 4-sulfamoylbutyl and the like.

As the halogen represented by X, chloro, fluoro, bromo, and the like can be referred to, among which chloro and fluoro are preferable.

When X represents an optionally substituted pyridinio group, examples of the substituent include carboxy, carbamoyl, sulfo, halogen and alkyl having 1–4 carbon atoms. As the pyridinio group represented by X, carboxy- or carbamoyl-substituted pyridinio groups are particularly preferable.

When X is $R_4$,

examples of the optionally substituted alkyl group represented by $R_4$ and $R_5$ include methyl, ethyl, n-propyl, i-propyl, n-butyl, i-butyl, sec-butyl, β-hydroxyethyl, β-sulfatoethyl, β-methoxyethyl, β-carboxymethyl and the like; examples of the optionally substituted phenyl group include phenyl, 2-, 3- or 4-sulfophenyl, 2-, 3- or 4-carboxyphenyl, 2-, 3- or 4-chlorophenyl, 3,4-, 3,5- or 3,6-disulfophenyl and the like; examples of the optionally substituted benzyl group include benzyl, 2-, 3- or 4-sulfobenzyl and the like; and examples of the optionally substituted naphthyl group include 2-, 3-, 4-, 5-, 6-, 7- or 8-sulfo-1-naphthyl, 1-, 5-, 6-, 7- or 8-sulfo-2-naphthyl, 2,4-, 5,7-, 6,8-, 4,8-, 4,7-, 3,8-, 4,6-, 3,7- or 3,6-disulfo-2-naphthyl, 4,6,8-, 2,4,7- or 3,6,8-trisulfo-1-naphthyl, 1,5,7-, 4,6,8- or 3,6,8-trisulfo-2-naphthyl and the like.

In the present invention, the alkyl and alkoxy are those having 1 to 4 carbon atoms, respectively, unless otherwise specified.

The reactive dyes represented by the formula (III) can be produced according to a known method, for example, by using an aromatic amine compound represented by the following formula:

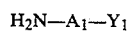

wherein $Y_1$ is as defined above and meaning of $A_1$ is the same as that of A in the formula (IV), as a diazo component or a condensed component.

The reactive dye represented by the formula (IV) can be produced by subjecting 2,4,6-trihalogeno-s-triazine to successive condensation reactions in an aqueous medium a sulfo group-containing compound represented by the following formula:

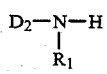

wherein $D_2$ and $R_1$ are as defined above, a compound represented by the following formula:

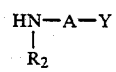

wherein $R_2$, A and Y are as defined above, and optionally a compound represented by the following formula:

or

wherein $R_3$, $R_4$ and $R_5$ are as defined above, in an arbitrary order.

In producing the granular composition of the present invention, turkey red oil and the compounds represented by the above-mentioned formulas (1) to (3) are used as a granulating auxiliary agent either singly or in the form of a mixture of two or more members. When the compounds represented by formulas (1) to (3) are used, it is preferable to use them in combination with at least one emulsifier selected from the group consisting of compounds represented by the following formula (4):

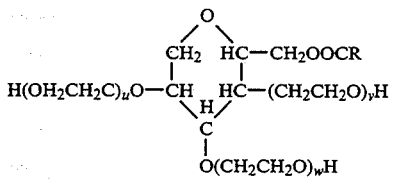

wherein R represents a saturated or unsaturated aliphatic group, such as alkyl and alkenyl, having 7 to 23 carbon atoms and u+v+w represents a number of 10 to 30, and compounds represented by the following formula (5):

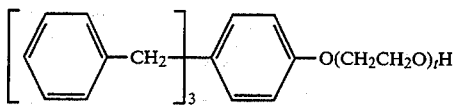

wherein t represents a number of 5 to 50. The compounds represented by the formulas (1) and (2) used in the present invention are well known as higher fatty acid esters, and the compounds represented by the formula (3) are commercially available under the name of, for example, vinycizer 80 (manufactured by Kao K.K.). The compounds represented by the formulas (4) and (5) are also commercially available under the names of Rheodol Super TW and Emulgen B (both manufactured by Kao K.K.), respectively. These granulating auxiliary agents are used in an amount of 5 parts by weight or less, preferably 3 parts by weight or less and more preferably 0.01 to 1 part by weight, per 100 parts by weight of the above-mentioned reactive dye. Preferably, these granulating auxiliary agents are used in the form of an aqueous solution or an aqueous suspension.

The emulsifiers represented by the formulas (4) and (5) are used in an amount of 5 to 100% by weight, preferably 10 to 50% by weight, based on the weight of the granulating auxiliary agent.

The process for producing the granular composition of the present invention is not particularly limited, but it can be produced by, for example, preparing an aqueous composition comprising the reactive dye and the above-mentioned granulating auxiliary agents and subjecting the aqueous composition to drying granulation.

In preparing the aqueous composition, the reactive dye can be used in a powdery form produced according to conventional methods, or in the form of a wet cake or a reaction mixture obtained in the course of the production of the reactive dye. Though a solid content including the reactive dye and the granulating auxiliary agents in the aqueous composition is not particularly limited, it is usually 5% by weight or more and preferably 10% by weight or more. The solid content is 30% by weight or more preferably from viewpoint of drying efficiency. Considering operation efficiency and so on, upper limit of the solid content is preferably 60 to 70% by weight. For controlling the solid content, demineralization of the aqueous composition can be carried out according to known procedures such as cooling method of the aqueous dye solution, demineralization method using membrane and the like.

The drying granulation of the aqueous composition is to carry out the drying and granulation simultaneously, and can be carried out advantageously using, for example, a spray drier or a fluidized bed spray drier.

The granular composition of the present invention can also be produced by granulating the reactive dye in a powdery form and spraying an aqueous solution or suspension of the granulating auxiliary agent onto the formed granules while subjecting the granule to drying. More specifically, the reactive dye in a powdery form is charged into a fluidized bed granulator non-equipped or equipped with rotating disk and agitator or the like to form a fluidized bed, and water or an aqueous solution of binder is simultaneously sprayed into the fluidized bed while the fluidized bed being continuously formed, whereby the powdery reactive dye can be formed into granule, which is followed by drying. At an appropriate time of the drying step, usually, when water content has reached 15% or less, an aqueous solution or suspension containing the granulating auxiliary agent is sprayed to the granule. When a predetermined quantity of the granulating auxiliary agent has been sprayed, drying is again started to complete dryness, whereby the desired granular composition can be obtained.

In the present invention, the drying is preferably completed at a time when the water content comes to 15% by weight or less.

The granular composition of the present invention may contain inorganic salts including sodium acetate formed as by-products in a conventional dye production process, as well as binders such as sodium alginate, CMC, PVA, other water-soluble polymers and the like, dispersing agents, surfactants, dyeing auxiliaries, solubilizing agents, antifoaming agents, antiseptic agents and the like. Further, the present granular composition may contain a pH buffer such as sodium or potassium acetate, sodium or potassium oxalate, sodium or potassium borate, sodium or potassium phosphates, or mixtures thereof.

In the present invention, the granular composition obtained can be preferably classified to regulate the particle size of the granules between about 60 $\mu$m and about 1,000 $\mu$m. The classification can be carried out in a conventional manner. For example, it can be carried out by rejecting coarse particles having a size of greater than about 1,000 $\mu$m using a standard sieve having a mesh of 1.0 mm as prescribed in JIS Z8801 and rejecting fine particles having a size of smaller than about 60 $\mu$m using an air classifier, fluidized bed classifier, vibrated sieve classifier and the like.

The bulk density of the granular composition obtained according to the present invention is usually in the range of 0.4 to 1 g/cm$^3$.

The granular composition of the present invention thus obtained is superior in the anti-dusting property, and excellent in particle strength, water dissolution property and fluidity. Furthermore, these excellent characteristic properties can hardly be deteriorated even when the composition is stored at ambient temperature for a period of one year or longer or at 60° C. for 2 weeks or longer, demonstrating its excellency in storage stability. Owing to these excellent characteristic properties, the granular composition of the present invention is suitable for the automatic weighing or dispensing systems in dye houses and requires only a short period of time for dissolution into water, and it can be industrially advantageously used for dyeing or printing fibers such as natural and regenerated celluloses, wool, silk, synthetic polyamides, and the like.

The present invention will be explained in more detail by way of the following examples. The invention is by no means limited by these examples. In the examples, dusting property and particle strength were evaluated according to the following measurements.

Dusting property: A granular dye composition is made to fall in a dust chamber through a falling tube having a diameter of 47 mm and a height of 800 mm. The dust formed is aspirated through a filter paper at a constant flow rate, and the extent of staining of the filter paper is examined, based on which the grade of dusting is determined. The grade is classified into A, B, C, D and E, wherein A expresses "no staining" and E expresses "the greatest staining".

Particle strength: A granular dye composition is introduced into a 100 ml thick-wall glass bottle followed by upward and downward shaking for a predetermined period of time using a paint conditioner, and then the quantity of fine powder (63 μm or smaller) is measured

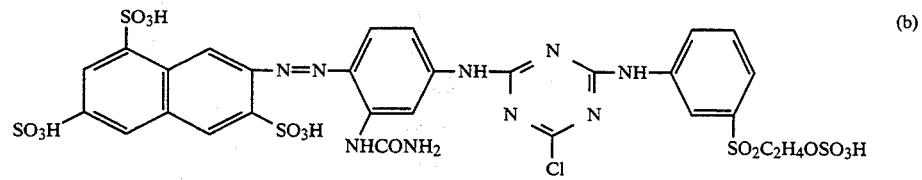

(b)

with a sieve type particle size distribution measurement apparatus. Based on the result, particle strength is evaluated. The particle strength decreases with increase of the quantity of the fine powder.

EXAMPLE 1

To 1,000 parts by weight of an aqueous dye solution having a dye content of 13.0% by weight and containing a dye represented by the following formula (a) in the free acid form:

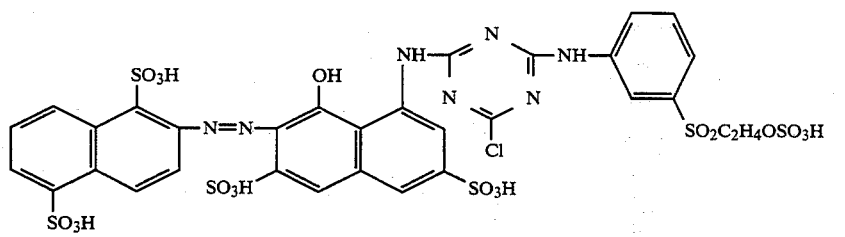

(a)

were added 19 parts by weight of sodium primary phosphate and 40 parts by weight of anhydrous sodium sulfate which was added for standardizing the dye concentration in a final dye composition, and pH value of the dye solution was adjusted to 6.0. Further, 0.1 part by weight [corresponding to 0.08% by weight based on the weight of the dye (a)] of a mixture of a compound represented by the above-mentioned formula (2) wherein m was 17 and n was 16 as a granulating auxiliary agent and a compound represented by formula (4) wherein R was $C_{17}H_{33}$ and u+v+w was 20 as an emulsifier, the weight ratio of the auxiliary agent to the emulsifier being 8:2, was added and suspended into the dye solution. The mixture thus obtained was spray-dried by spraying it from the upper nozzle of a spray drier. The granulated and dried product was continuously taken out of the lower part of the drier. Then, fine particles having particle sizes smaller than about 60 μm were separated and rejected by means of an air classifier. The granular reactive dye composition obtained according to the above-mentioned procedure had the following characteristic properties. It was quite superior in anti-dusting property, high in particle strength and excellent in water dissolution property.

| Bulk density | 0.48 g/cm³ | | |
|---|---|---|---|
| Particle size distribution | <63 μm 0.2% | 63–250 μm 83.6% | 250–500 μm 16.2% |
| Dusting property | A | | |
| Particle strength | 0.5% (<63 μm) | | |
| Water content | 6.3% | | |

EXAMPLE 2

To 1,000 parts by weight of an aqueous dye solution (dye content 10.3% by weight) containing a dye represented by the following formula (b) in the free acid form:

were added sodium primary phosphate, naphthalenesulfonic acid-formaldehyde condensate (Demol RN, manufactured by Kao K.K.) and anhydrous sodium sulfate necessary for standardizing the dye concentration in a final dye composition. Then, pH value of the dye solution thus obtained (solid content 17.5% by weight) was adjusted to 5.7. Further, 0.1 part by weight (corresponding to 0.1% by weight of the dye component) of a 7:2:1 (by weight) mixture consisting of a compound represented by formula (3) wherein R was

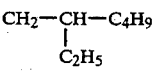

as a granulating auxiliary agent and the compounds represented by formula (4) wherein R was $C_{17}H_{33}$ and u+v+w was 20 and formula (5) wherein t was 20, both as an emulsifier, was added and suspended into the dye solution, and the mixture thus obtained was spray-dried by jetting it from the upper nozzle of a spray drier. The granulated and dried product thus obtained was continuously discharged from the bottom of the drier. Then, fine particles having particle sizes smaller than about 60 μm were separated and rejected by means of an air classifier.

The granular reactive dye composition thus obtained had the following characteristic properties. It was quite superior in anti-dusting property, high in particle strength and in water dissolution property.

| Bulk density | 0.52 g/cm³ | | |
|---|---|---|---|
| Particle size distribution | <63 μm 0.3% | 63–250 μm 94.8% | 250–500 μm 4.9% |
| Dusting property | A-B | | |
| Particle strength | 0.6% (<63 μm) | | |
| Water content | 6.8% | | |

EXAMPLE 3

To 1,000 parts by weight of an aqueous dye solution (dye content 13.0% by weight) containing the dye represented by the above-mentioned formula (a) in the free acid form were added sodium primary phosphate and anhydrous sodium sulfate necessary for standardizing the dye concentration in a final dye composition. Thus, pH value of the dye solution thus obtained (solid content 22% by weight) was adjusted to 5.8. Further, 0.5 part by weight of turkey red oil (corresponding to 0.38% by weight based on the dye component) was added and dissolved into the dye solution as a granulating auxiliary agent, and the mixture thus obtained was spray-dried by spraying it from the upper nozzle of a spray-dryer. The granulated and dried product thus obtained was continuously discharged from the bottom of the drier. Then, fine particles having sizes smaller than about 60 μm were separated and rejected by means of an air classifier.

The granular reactive dye composition obtained by the above-mentioned procedure had the following characteristic properties. It was quite superior in anti-dusting property, high in particle strength and in water dissolution property.

| Bulk density | 0.45 g/cm³ | | |
|---|---|---|---|
| Particle size distribution | <63 μm 0.2% | 63–250 μm 75.5% | 250–500 μm 24.3% |
| Dusting property | A | | |
| Particle strength | 0.4% (<63 μm) | | |
| Water content | 5.8% | | |

EXAMPLE 4

To 1,000 parts by weight of an aqueous dye solution (dye content 12.0% by weight) containing a dye represented by the following formula (C) in the free acid form:

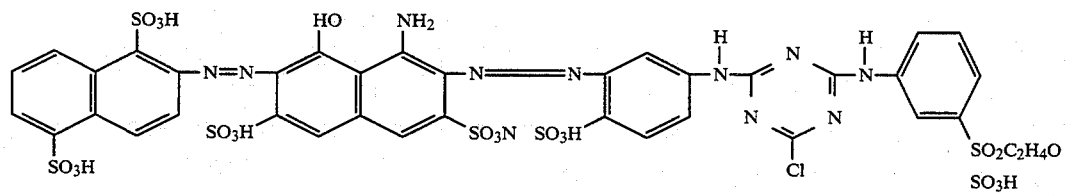

were added sodium primary phosphate and anhydrous sodium sulfate necessary for standardizing the dye concentration in a final dye composition. Then, pH value of the dye solution (solid content 16.4% by weight) thus obtained was adjusted to 5.4. Further, 0.6 part by weight of turkey red oil (corresponding to 0.4% by weight of the dye component) was added and dissolved into the dye solution as a granulating auxiliary agent, and the mixture was spray-dried by spraying it from the upper nozzle of a spray-dryer. The granulated and dried product thus obtained was continuously discharged from the bottom of the drier. Then, fine particles having particle sizes smaller than about 60 μm were separated and rejected by means of an air classifier.

The granular reactive dye composition obtained by the above-mentioned treatment had the following characteristic properties. It was quite superior in anti-dusting property, high in particle strength and in water dissolution property.

| Bulk density | 0.59 g/cm³ | | |
|---|---|---|---|
| Particle size distribution | <63 μm 0.2% | 63–250 μm 98.5% | 250–500 μm 1.3% |
| Dusting property | A | | |
| Particle strength | 0.4% (<63 μm) | | |
| Water content | 5.1% | | |

EXAMPLE 5

To 1,000 parts by weight of an aqueous dye solution (dye content 13.0% by weight) containing a dye represented by formula (a) in the free acid form were added sodium primary phosphate and anhydrous sodium sulfate necessary for standardizing the dye concentration in a final dye composition. Then, pH value of the dye solution (solid content 22% by weight) thus obtained was adjusted to 6.0. Further, 0.4 part by weight (corresponding to 0.3% by weight based on the dye component) of turkey red oil as a granulating auxiliary agent and 0.12 part by weight (corresponding to 0.09% by weight based on the dye component) of a 7:2:1 (by weight) mixture consisting of a compound represented by formula (3) wherein R was

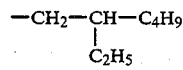

as a granulating auxiliary agent, a compound represented by formula (4) wherein R was $C_{17}H_{33}$ and $u+v+w$ was 20 and a compound represented by formula (5) wherein t was 15, both as an emulsifier, was added and suspended into the dye solution. The suspension was sprayed from the upper nozzle of a fluidized bed spray drier. While forming a fluidized layer of dried particles in the lower part of the drier, granulation was made to progress successively. The dye granules of which particle size had exceeded a predetermined value were continuously discharged to outside by means of a screw feeder. Then, fine particles having a size smaller than 60 μm were separated and removed by means of an air classifier. The granular reactive dye composition obtained by the above-mentioned treatment had the following characteristic properties. It was quite superior in anti-dusting property, high in particle strength and in water-dissolution property.

| Bulk density | 0.51 g/cm³ | | |
|---|---|---|---|
| Particle size distribution | <63 μm 0.2% | 63–250 μm 70.6% | 250–500 μm 29.2% |
| Dusting property | A | | |
| Particle strength | 0.4% (<63 μm) | | |
| Water content | 6.5% | | |

EXAMPLE 6

To 1,000 parts by weight of an aqueous dye solution (dye content 11.0% by weight) containing a dye represented by the following formula (d) in the free acid form:

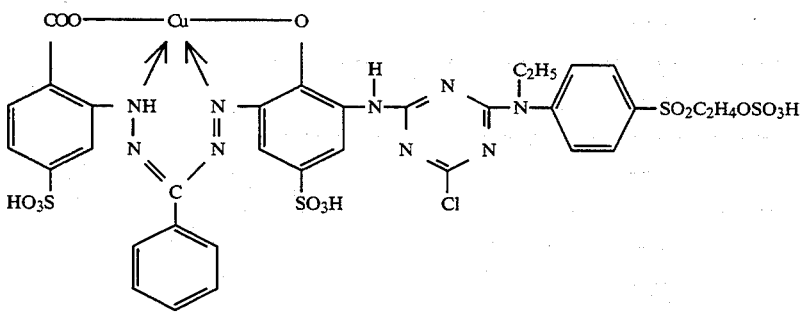

(d)

where added sodium primary phosphate and naphthalenesulfonic acid-formaldehyde condensate. Then, pH value of the dye solution thus obtained (solid content 18.2% by weight) was adjusted to 5.8. Further, 0.1 part by weight (corresponding to 0.09% by weight based on the dye component) of a 7:2:1 (by weight) mixture consisting of a compound of formula (3) wherein R was

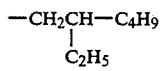

by formula (4) wherein R was $C_{17}H_{33}$ and $u+v+w$ was 22 and a compound represented by formula (5) wherein t was 30, both as an emulsifier, was added and suspended. The suspension was sprayed from the upper nozzle of a fluidized bed spray drier, and granulation was successively made to progress while forming a fluidized layer of dried particles in the lower part of the drier. Granulated dye particles of which particle size had exceeded a predetermined value were continuously discharged to the outside by means of a screw feeder. Then, fine particles having a size smaller than about 60 μm were separated and rejected by means of an air classifier. The granular reactive dye composition obtained by the above-mentioned treatment had the following characteristic properties. It was quite superior in anti-dusting property, high in particle strength and in water dissolution property.

| Bulk density | 0.54 g/cm³ | | |
| --- | --- | --- | --- |
| Particle size distribution | <63 μm 0.3% | 63–250 μm 80.2% | 250–500 μm 19.5% |
| Dusting property | A–B | | |
| Particle strength | 0.5% (<63 μm) | | |
| Water content | 6.5% | | |

EXAMPLE 7

To an aqueous dye solution (dye content 10.3% by weight) containing the dye represented by formula (b) in the free acid form were added sodium primary phosphate, naphthalenesulfonic acid-formaldehyde condensate and anhydrous sodium sulfate necessary for standardizing the dye concentration in a final dye composition. Then, pH value of the dye solution thus obtained (solid content 17.5% by weight) was adjusted to 5.8. Further, 0.58% by weight, based on the dye component, of turkey red oil was added and dissolved thereinto as a granulating auxiliary agent, and the resulting solution was sprayed from the upper nozzle of a fluidized bed spray drier. Granulation was successively made to progress while forming a fluidized layer of dried particles in the lower part of the drier. Dye particles of which size had exceeded a predetermined value were continuously discharged to the outside by means of a screw feeder. Then, fine particles having a size smaller than about 60 μm were separated and rejected by means of a classifier. The granular reactive dye composition obtained by the above-mentioned treatment had the following properties. It was quite good in anti-dusting property, high in particle strength and in water dissolution property.

| Bulk density | 0.49 g/cm³ | | |
| --- | --- | --- | --- |
| Particle size distribution | <63 μm 0.3% | 63–250 μm 68.9% | 250–500 μm 30.8% |
| Dusting property | B | | |
| Particle strength | 0.7% (<63 μm) | | |
| Water content | 7.5% | | |

EXAMPLE 8

In preparing a granular reactive dye composition by using a fluidized bed drier, 500 parts by weight of the dye represented by formula (a) in the free acid form (a powdery reactive dye dried with usual spray drier) (dye content 52.2% by weight) was charged into a fluidized bed drier, and a fluidized layer was formed by means of hot air. Granulation was carried out, while spraying water as a binder into the fluidized bed so as to maintain a constant water content. After granulation, the spraying of water was stopped, an intermediate drying was carried out, subsequently a 10% (by weight) aqueous solution of turkey red oil was sprayed as a granulating auxiliary agent at a rate of 13 parts by weight per minute for a period of 3 minutes, and after completion of the spraying a finish drying was carried out for 10 minutes. At the time of granulation and drying, the inlet temperature of hot air was adjusted to 80° C. The total one batch quantity of the granulated and dried product was taken out, and fine particles having a size smaller than about 60 m were separated and rejected by means of an air classifier. The granular reactive dye composition obtained by the above-mentioned treatment had the following properties. It was quite superior in anti-dusting property, high in particle strength and in water dissolution property.

Characteristic properties of the product:

| Bulk density | 0.66 g/cm³ | | |
| --- | --- | --- | --- |
| Particle size distribution | <63 μm 0.3% 500–1,000 μm 24.4% | 63–250 μm 43.2% | 250–500 μm 32.1% |
| Dusting property | A | | |
| Particle strength | 0.5% (<63 μm) | | |

Water content    8.7%

EXAMPLE 9

In producing a granular reactive dye composition by using a fluidized bed granulator, 500 parts by weight of a dye represented by the following formula (e) in the free acid form:

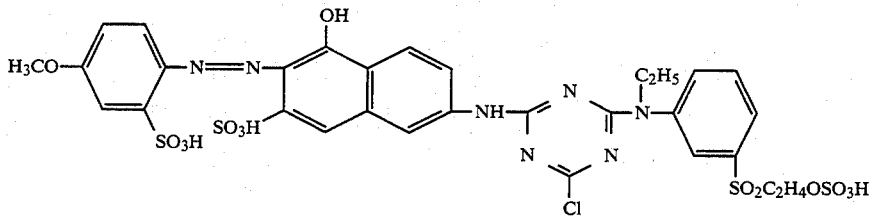

(a powdery reactive dye dried with usual spray drier) (dye content 41.7% by weight) was charged into a fluidized bed granulator, and thereafter the procedure of Example 8 was repeated, except that 1% by weight aqueous solution of PVA was used as a binder and an aqueous suspension containing 5.0% by weight of a 7:2:1 (by weight) mixture consisting of a compound of formula (3) wherein R was

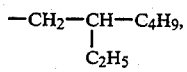

as a granulating auxiliary agent, a compound represented by formula (4) wherein R was $C_{17}H_{33}$ and u+v+w was 20 and a compound represented by formula (5) wherein t was 10 (the latter two were both as an emulsifier) was sprayed at a rate of 9 parts by weight per minute for a period of 3.5 minutes. Thus, a granular reactive dye composition was obtained. Characteristic properties of the product:

| Bulk density | 0.45 g/cm³ | | |
|---|---|---|---|
| Particle size distribution | <63 μm 0.2% 500–1,000 μm 2.7% | 63–250 μm 77.6% | 250–500 μm 19.5% |
| Dusting property | B | | |
| Particle strength | 0.5% (<63 μm) | | |
| Water content | 7.5% | | |

EXAMPLE 10

To 1,000 parts by weight of an aqueous dye solution (dye content 14.3% by weight) containing the dye represented by the above-mentioned formula (a) in the free acid form were added sodium primary phosphate and anhydrous sodium sulfate necessary for standardizing the dye concentration in a final dye composition. Then, pH value of the dye solution thus obtained (solid content 24.1% by weight) was adjusted to 6.0. Further, 0.13 part by weight of the same granulating auxiliary agent-/emulsifier mixture as in Example 1 (corresponding to 0.09% by weight based on the dye component) was added and suspended into the dye solution, and the mixture thus obtained was spray-dried by spraying it from the upper nozzle of a spray-dryer. The granulated and dried product thus obtained was continuously discharged from the bottom of the drier. Then, fine particles having sizes smaller than about 60 μm were separated and rejected by means of an air classifier.

The granular reactive dye composition obtained by the above-mentioned procedure had the following characteristic properties. It was quite superior in anti-dusting property, high in particle strength and in water dissolution property.

| Bulk density | 0.50 g/cm³ | | |
|---|---|---|---|
| Particle size distribution | <63 μm 0.1% 250–500 μm 14.5% | 63–250 μm 4.5% 500 μm < 0% | 100–250 μm 80.9% |
| Dusting property | A | | |
| Particle strength | 0.3% (<63 μm) | | |
| Water content | 6.5% | | |

EXAMPLE 11

To 1,000 parts by weight of an aqueous dye solution (dye content 12.4% by weight) containing the dye represented by the above-mentioned formula (b) in the free acid form were added sodium primary phosphate and anhydrous sodium sulfate necessary for standardizing the dye concentration in a final dye composition. Then, pH value of the dye solution thus obtained (solid content 20.9% by weight) was adjusted to 5.7. Further, 0.1 part by weight of the same granulating auxiliary agent-/emulsifier mixture as in Example 2 (corresponding to 0.08% by weight based on the dye component) was added and suspended into the dye solution, and the mixture thus obtained was spray-dried by spraying it from the upper nozzle of a spray-dryer. The granulated and dried product thus obtained was continuously discharged from the bottom of the drier. Then, fine particles having sizes smaller than about 60 μm were separated and rejected by means of an air classifier.

The granular reactive dye composition obtained by the above-mentioned procedure had the following characteristic properties. It was quite superior in anti-dusting property, high in particle strength and in water dissolution property.

| Bulk density | 0.55 g/cm³ | | |
|---|---|---|---|
| Particle size distribution | <63 μm 0.2% 250–500 μm 7.4% | 63–250 μm 2.7% 500 μm < 0% | 100–250 μm 89.7% |
| Dusting property | A–B | | |
| Particle strength | 0.4% (<63 μm) | | |
| Water content | 6.0% | | |

EXAMPLE 12

To 1,000 parts by eight of an aqueous dye solution (dye content 12.6% by weight) containing a dye represented by the following formula (f) in the free acid form:

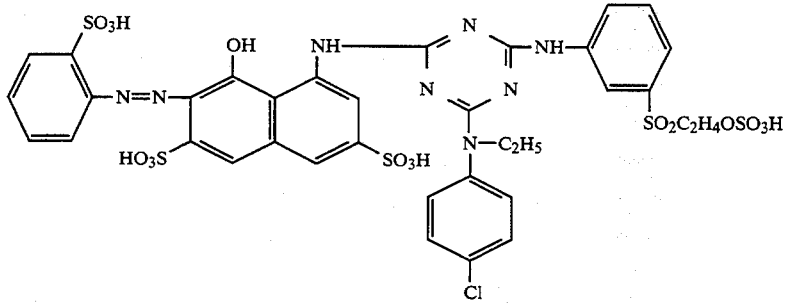

were added sodium primary phosphate and anhydrous sodium sulfate necessary for standardizing the dye concentration in a final dye composition. Then, pH value of the dye solution (solid content 21.5% by weight) thus obtained was adjusted to 5.4. Further, 0.6 part by weight of turkey red oil (corresponding to 0.48% by weight of the dye component after dryness) was added and dissolved into the dye solution, and the mixture was spray-dried by spraying it from the upper nozzle of a spray-dryer. The granulated and dried product thus obtained was continuously discharged from the bottom of the drier. Then, fine particles having particle sizes smaller than about 60 μm were separated and rejected by means of an air classifier.

The granular reactive dye composition obtained by the above-mentioned treatment had the following characteristic properties. It was quite superior in anti-dusting property, high in particle strength and in water dissolution property.

| Bulk density | 0.59 g/cm$^3$ | | |
|---|---|---|---|
| Particle size distribution | <63 μm 0.1% | 63-100 μm 3.2% | 100-250 μm 85.9% |
| | 250-500 μm 10.8% | 500 μm < 0% | |
| Dusting property | A | | |
| Particle strength | 0.3% (<63 μm) | | |
| Water content | 5.1% | | |

EXAMPLE 13

To 1,000 parts by weight of an aqueous dye solution (dye content 13.4% by weight) containing a dye represented by the following formula (g) in the free acid form:

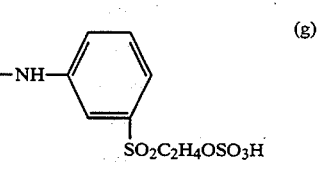

were added sodium primary phosphate and anhydrous sodium sulfate necessary for standardizing the dye concentration in a final dye composition, and pH value of the dye solution thus obtained (solid content 17.8% by weight) was adjusted to 6.0. Further, 0.1 part by weight (corresponding to 0.08% by weight of the dye component) of a 8:2 (by weight) mixture consisting of a compound represented by the above-mentioned formula (2) wherein m was 17 and n was 16 as a granulating auxiliary agent and a compound represented by formula (4) wherein R was $C_{17}H_{33}$ and u+v+w was 20 as an emulsifier was added and suspended into the dye solution. The mixture thus obtained was spray-dried by spraying it from the upper nozzle of a spray drier. The granulated and dried product was continuously discharged from the bottom of the drier. Then, fine particles having particle sizes smaller than about 60 μm were separated and rejected by means of an air classifier. The granular reactive dye composition obtained according to the above-mentioned procedure had the following characteristic properties. It was quite superior in anti-dusting property, high in particle strength and in water-dissolution property.

| Bulk density | 0.51 g/cm$^3$ | | |
|---|---|---|---|
| Particle size distribution | <63 μm 0.5% | 63-250 μm 80.6% | 250-500 μm 18.9% |
| Dusting property | A | | |
| Particle strength | 0.8% (<63 μm) | | |
| Water content | 5.0% | | |

EXAMPLE 14

To 1,000 parts by weight of an aqueous dye solution (dye content 13.0% by weight) containing a dye represented by formula (b) in the free acid form were added sodium primary phosphate and anhydrous sodium sulfate necessary for standardizing the dye concentration in a final dye composition. Then, pH value of the dye solution (solid content 21.9% by weight) thus obtained was adjusted to 5.7. Further, 0.1 part by weight (corresponding to 0.1% by weight based on the dye component) of a 7:2:1 (by weight) mixture consisting of a compound represented by formula (3) wherein R was

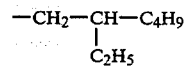

as a granulating auxiliary agent, a compound represented by formula (4) wherein R was $C_{17}H_{33}$ and u+v+w was 20 and a compound represented by formula (5) wherein t was 20, both as an emulsifier, was added and suspended into the dye solution. The suspension was spray-dried by spraying it from the upper nozzle of a fluidized bed spray drier. The granulated and dried product was continuously discharged from the bottom of the drier. Then, fine particles having sizes smaller than 60 μm were separated and rejected by means of an air classifier.

The granular reactive dye composition obtained by the above-mentioned treatment has the following characteristic properties. It was quite superior in anti-dusting property, high in particle strength and in water dissolution property.

| Bulk density | 0.55 g/cm³ | | |
| --- | --- | --- | --- |
| Particle size distribution | <63 μm 0.6% | 63–250 μm 91.1% | 250–500 μm 8.3% |
| Dusting property | A | | |
| Particle strength | 0.8% (<63 μm) | | |
| Water content | 6.0% | | |

EXAMPLE 15

To 1,000 parts by weight of an aqueous dye solution (dye content 23.1% by weight) containing a dye represented by the following formula (h) in the free acid form:

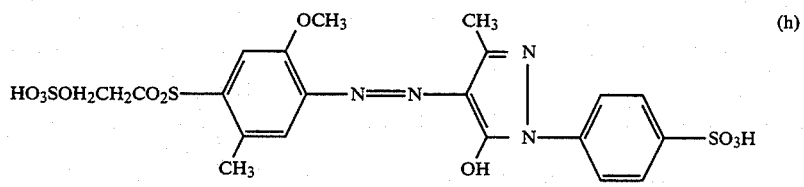

(h)

were added naphthalenesulfonic acid-formaldehyde condensate and anhydrous sodium sulfate necessary for standardizing the dye concentration in a final dye composition. Then, pH value of the dye solution thus obtained (solid content 34.2% by weight) was adjusted to 5.5. Further, 0.23 part by weight (corresponding to 0.1% by weight based on the dye component) of a 7:2:1 (by weight) mixture consisting of a compound of formula (3) wherein R was

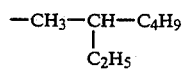

as a granulating auxiliary agent, a compound represented by formula (4) wherein R was $C_{17}H_{33}$ and u+v+w was 20 and a compound represented by formula (5) wherein t was 15, both as an emulsifier, was added and suspended. The suspension was spray-dried by spraying it from the upper nozzle of a spray drier, and the granulated and dried dye was continuously discharged from the bottom of the drier. Then, fine particles of which particle sizes were smaller than about 60 μm were separated and rejected by means of an air classifier.

The granular reactive dye composition obtained by the above-mentioned treatment had the following characteristic properties. It was quite superior in anti-dusting property, high in particle strength and in water dissolution property.

| Bulk density | 0.45 g/cm³ | | |
| --- | --- | --- | --- |
| Particle size distribution | <63 μm 0.7% | 63–250 μm 79.7% | 250–500 μm 19.6% |
| Dusting property | A–B | | |
| Particle strength | 1.0% (<63 μm) | | |
| Water content | 4.5% | | |

EXAMPLE 16

To 1,000 parts by weight of an aqueous dye solution (dye content 13.6% by weight) containing a dye represented by the following formula (i) in the free acid form:

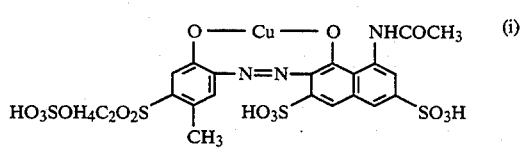

(i)

were added naphthalenesulfonic acid-formaldehyde condensate and anhydrous sodium sulfate necessary for standardizing the dye concentration in a final dye composition. Then, pH value of the dye solution thus obtained (solid content 26.9% by weight) was adjusted to 5.7. Further, 0.14 part by weight (corresponding to 0.1% by weight based on the dye component) of a 7:2:1 (by weight) mixture consisting of a compound of formula (3) wherein R was

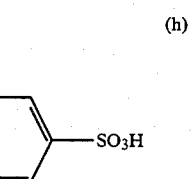

as a granulating auxiliary agent, a compound represented by formula (4) wherein R was $C_{17}H_{33}$ and u+v+w was 20 and a compound represented by formula (5)wherein t was 20, both as an emulsifier, was added and suspended. The suspension was spray-dried by spraying it from the upper nozzle of a spray drier, and the granulated and dried dye was continuously discharged from the bottom of the drier. Then, fine particles of which particle sizes were smaller than about 60 μm were separated and rejected by means of an air classifier.

The granular reactive dye composition obtained by the above-mentioned treatment had the following characteristic properties. It was quite superior in anti-dusting property, high in particle strength and in water dissolution property.

| Bulk density | 0.50 g/cm³ | | |
| --- | --- | --- | --- |
| Particle size distribution | <63 μm 0.6% | 63–250 μm 83.3% | 250–500 μm 16.1% |
| Dusting property | A–B | | |
| Particle strength | 0.9% (<63 μm) | | |

| | |
|---|---|
| Water content | 4.8% |

EXAMPLE 17

To 1,000 parts by weight of an aqueous dye solution (dye content 27.5% by weight) containing a dye represented by the following formula (j) in the free acid form:

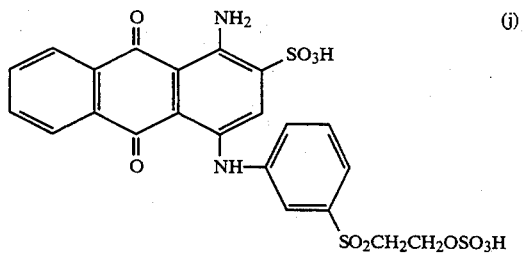

(j)

was added anhydrous sodium sulfate necessary for standardizing the dye concentration in a final dye composition. Then, pH value of the dye solution thus obtained (solid content 42.9% by weight) was adjusted to 5.7. Further, 0.7 part by weight (corresponding to 0.13% by weight based on the dye component) of a 7:2:1 (by weight mixture consisting of a compound of formula (3) wherein R was

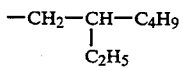

as a granulating auxiliary agent, a compound represented by formula (4) wherein R was $C_{17}H_{33}$ and u+v+w was 20 and a compound represented by formula (5) wherein t was 20, both as an emulsifier, was added and suspended thereto. The suspension was spray-dried by spraying it from the upper nozzle of a spray drier, and the granulated and dried dye was continuously discharged from the bottom of the drier. Then, fine particles of which particle sizes were smaller than about 60 μm were separated and rejected by means of an air classifier.

The granular reactive dye composition obtained by the above-mentioned treatment had the following characteristic properties. It was quite superior in anti-dusting property, high in particle strength and in water dissolution property.

| | | | |
|---|---|---|---|
| Bulk density | 0.61 g/cm³ | | |
| Particle size distribution | <63 μm 0.3% | 63–250 μm 93.4% | 250–500 μm 6.3% |
| Dusting property | A | | |
| Particle strength | 0.5% (<63 μm) | | |
| Water content | 6.4% | | |

EXAMPLE 18

To 1,000 parts by weight of an aqueous dye solution (dye content 17.5% by weight) containing a dye represented by the following formula (k) in the free acid form:

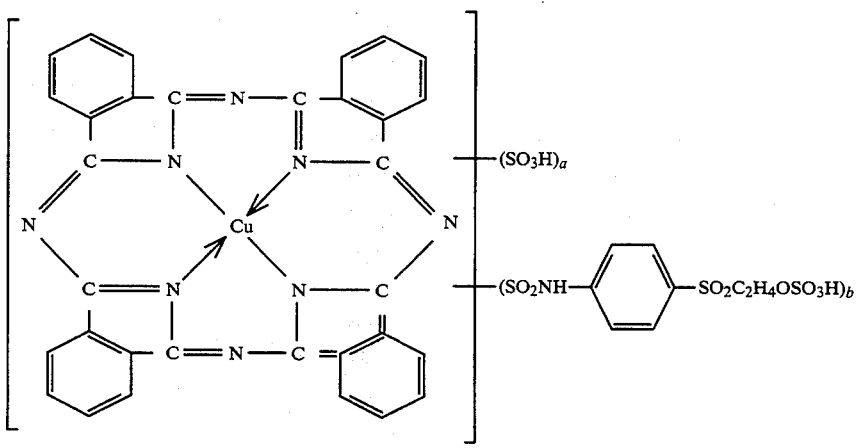

(a≧1, b≧1, provided that a+b≦4) was added sodium chloride necessary for standardizing the dye concentration in a final dye composition. Then, pH value of the dye solution thus obtained (solid content 36.8% by weight) was adjusted to 5.7. Further, 0.2 part by weight (corresponding to 0.11% by weight based on the dye component) of a 7:2:1 (by weight) mixture consisting of a compound of formula (3) wherein R was

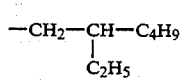

as a granulating auxiliary agent, a compound represented by formula (4) wherein R was $C_{17}H_{33}$ and u+v+w was 20 and a compound represented by formula (5) wherein t was 20, both as an emulsifier, was added and suspended thereto. The suspension was spray-dried by spraying it from the upper nozzle of a spray drier, and the granulated and dried dye was continuously discharged from the bottom of the drier. Then, fine particles of which particle sizes were smaller than about 60 μm were separated and rejected by means of an air classifier.

The granular reactive dye composition obtained by the above-mentioned treatment had the following characteristic properties. It was quite superior in anti-dusting property, high in particle strength, and in water dissolution property.

| Bulk density | 0.56 g/cm$^3$ | | |
|---|---|---|---|
| Particle size distribution | <63 μm 0.4% | 63–250 μm 81.2% | 250–500 μm 18.4% |
| Dusting property | A–B | | |
| Particle strength | 0.9% (<63 μm) | | |
| Water content | 6.8% | | |

EXAMPLE 19

To 1,000 parts by weight of an aqueous dye solution (dye content 16.9% by weight) containing a dye represented by the following formula (l) in the free acid form:

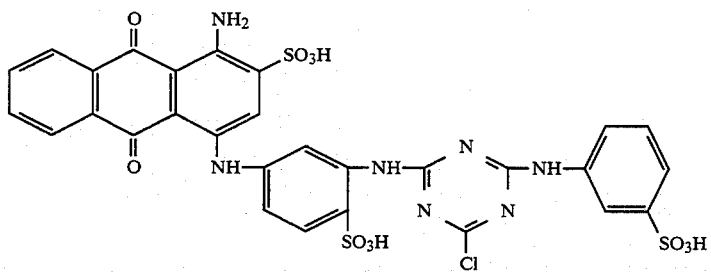

(l)

were added sodium secondary phosphate, naphthalenesulfonic acid-formaldehyde condensate and anhydrous sodium sulfate necessary for standardizing the dye concentration in a final dye composition. Then, pH value of the dye solution thus obtained (solid content 22.3% by weight) was adjusted to 7.7. Further, 0.7 part by weight (corresponding to 0.28% by weight based on the dried product) of a 7:2:1 (by weight) mixture consisting of a compound of formula (3) wherein R was

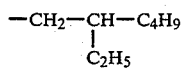

as a granulating auxiliary agent, a compound represented by formula (4) wherein R was $C_{17}H_{33}$ and u+v+w was 20 and a compound represented by formula (5) wherein t was 20, both as an emulsifier, was added and suspended thereinto. The suspension was spray-dried by spraying it from the upper nozzle of a spray drier, and the granulated and dried product was continuously discharged from the bottom of the drier. Then, fine particles of which particle sizes were smaller than about 60 μm were separated and rejected by means of an air classifier.

The granular reactive dye composition obtained by the above-mentioned treatment had the following characteristic properties. It was quite superior in anti-dusting property, high in particle strength and in water dissolution property.

| Bulk density | 0.55 g/cm$^3$ | | |
|---|---|---|---|
| Particle size distribution | <63 μm 0.5% | 63–250 μm 92.1% | 250–500 μm 7.4% |
| Dusting property | A–B | | |
| Particle strength | 0.9% (<63 μm) | | |
| Water content | 6.8% | | |

EXAMPLE 20

By the same method as either one of the methods of Examples 1–19, the reactive dyes represented the following formulas in the free acid form are granulated to obtain the intended granular compositions.

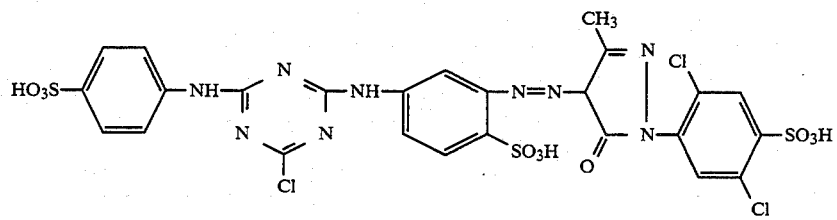

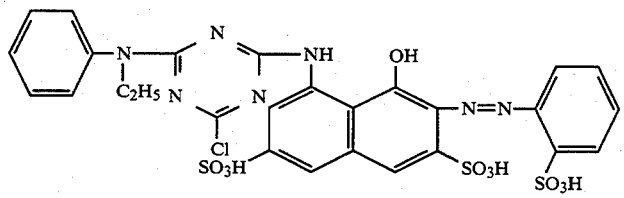

-continued
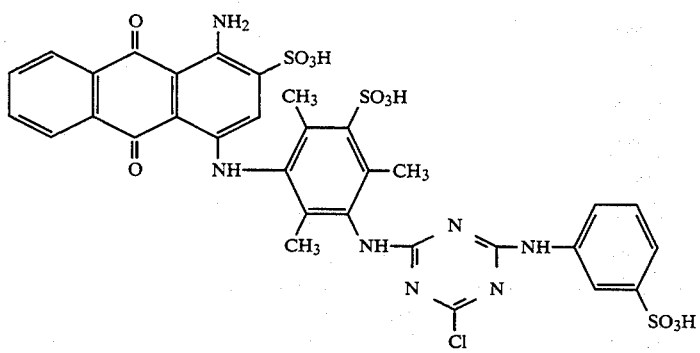
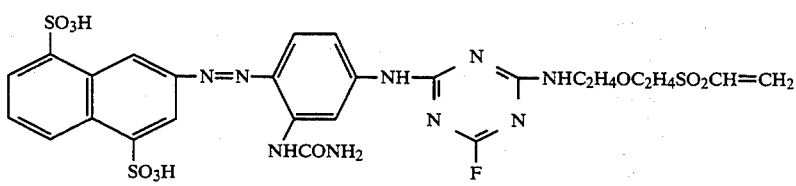
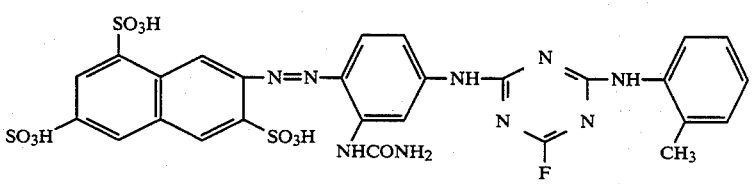
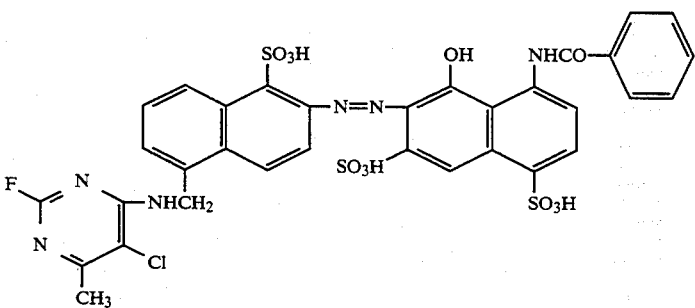
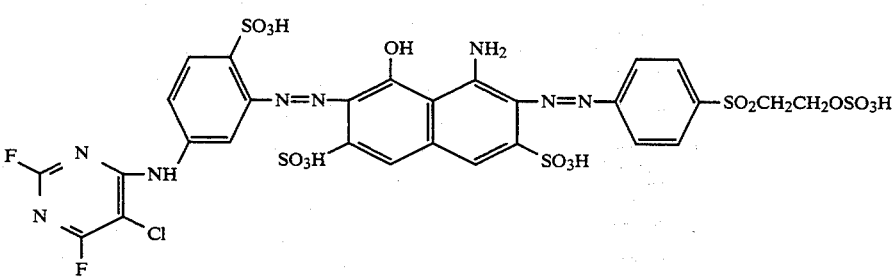
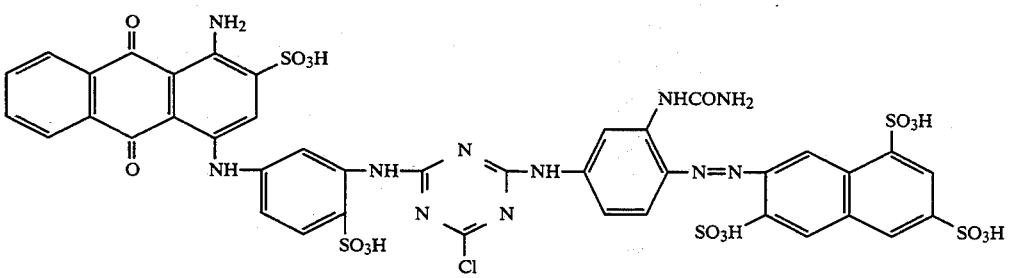

-continued

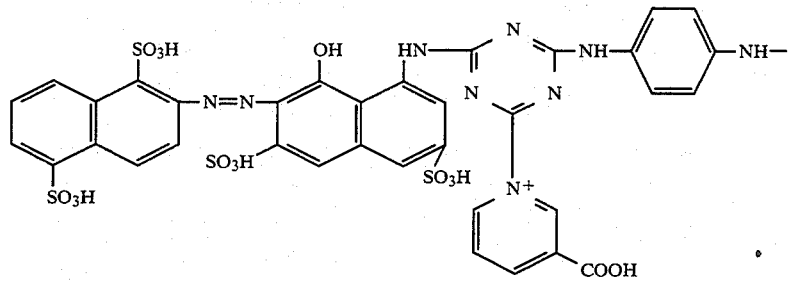

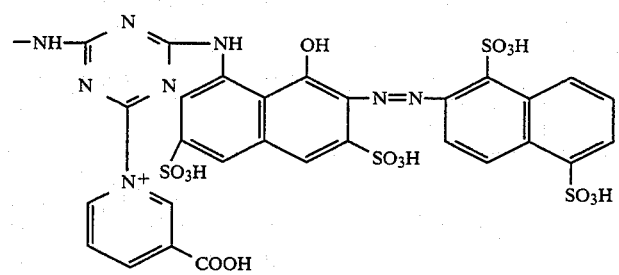

EXAMPLE 21

To 1,000 parts by weight of an aqueous dye solution (dye content 11.0% by weight) containing a dye represented by the following formula (d) in the free acid form:

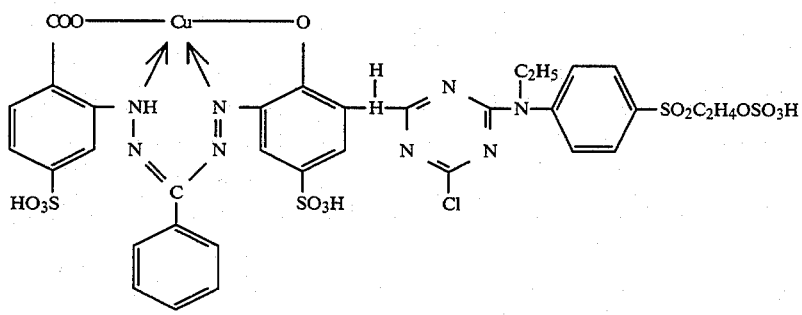

were added sodium primary phosphate and naphthalenesulfonic acid-formaldehyde condensate. Then, pH value of the dye solution thus obtained (solid content 18.2% by weight) was adjusted to 5.8. Further, 0.1 part by weight (corresponding to 0.09% by weight based on the dye component) of a 7:2:1 (by weight) mixture consisting of a compound of formula (3) wherein R was $-C_{13}H_{27}$ as a granulating auxiliary agent, a compound represented by formula (4) wherein R was $C_{17}H_{33}$ and u+v+w was 22 and a compound represented by formula (5) wherein t was 30, both as an emulsifier, was added and suspended thereinto. The suspension was spray-dried by spraying it from the upper nozzle of a spray drier, and granulation was successively made to progress while forming a fluidized layer of dried particles in the lower part of the drier. The granulated dye particles of which sizes had exceeded a predetermined value were continuously discharged by means of a screw feeder. Then, fine particles of which particle sizes were smaller than about 60 μm were separated and rejected by means of an air classifier. The granular reactive dye composition obtained by the above-mentioned treatment had the following characteristic properties. It was quite superior in anti-dusting property, high in particle strength and in water dissolution property.

| Bulk density | 0.51 g/cm³ | | |
|---|---|---|---|
| Particle size | <63 μm | 63–250 μm | 250–500 μm |
| distribution | 0.6% | 79.6% | 9.8% |

| Dusting property | A–B |
| Particle strength | 0.9% (<63 μm) |
| Water content | 6.3% |

EXAMPLE 22

To 1,000 parts by weight of an aqueous dye solution (dye content 27.5% by weight) containing a dye represented by the following formula (j) in the free acid form:

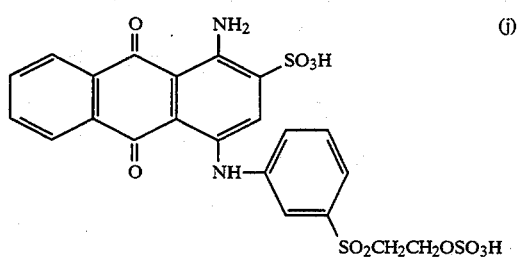

was added anhydrous sodium sulfate necessary for standardizing the dye concentration in a final dye composition. Then, pH value of the dye solution thus obtained (solid content 42.9% by weight) was adjusted to 5.7. Further, 0.7 part by weight (corresponding to 0.13% by weight based on the dried product) of a 7:2:1 (by weight) mixture consisting of a compound of formula (3) wherein R was —$C_9H_{19}$ as a granulating auxiliary agent, a compound represented by formula (4) wherein R was $C_{17}H_{33}$ and u+v+w was 20 and a compound represented by formula (5) wherein t was 20, both as an emulsifier, was added and suspended thereinto. The suspension was spray-dried by spraying it from the upper nozzle of spray drier. The granulated and dried product was continuously discharged from the bottom of the drier. Then, fine particles of which particle sizes were smaller than about 60 μm were separated and rejected by means of an air classifier.

The granular reactive dye composition obtained by the above-mentioned treatment had the following characteristic properties. It was quite superior in anti-dusting property, high in particle strength and in water dissolution property.

| Bulk density | 0.58 g/cm³ | | |
| --- | --- | --- | --- |
| Particle size distribution | <63 μm 0.5% | 63–250 μm 92.7% | 250–500 μm 6.8% |
| Dusting property | A–B | | |
| Particle strength | 0.8% (<63 μm) | | |
| Water content | 6.2% | | |

We claim:

1. A dye composition, which comprises a water-soluble reactive dye and a granulating auxiliary agent selected from the group consisting of the compounds represented by the following formula (3),

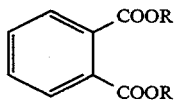
(3)

wherein R represents —$C_sH_{2s+1}$, wherein s represents a number of 5 to 20 and wherein the content of the granulating auxiliary agent is from about 0.01 to 5 parts by weight per 100 parts by weight of the reactive dye.

2. A granular composition according to claim 1, wherein the reactive dye is one having at least one fiber-reactive group of the type of pyridine, pyridazine, pyridazone, pyrimidine, s-triazine, quinoline, quinoxaline, quinazoline, phthalazine, benzene, saturated alkanemonocarboxylic acid amide, alkenemonocarbamide, alkenedicarboxyamide, vinylsulfamide, β-saturated ethyl sulfone or vinyl sulfone.

3. A granular composition according to claim 1, wherein the reactive dye is one having 1 to 3 fiber-reactive groups represented by the following formula (I) or (II)

(I)

(II)

wherein Z represents a group capable of being split by the action of an alkali.

4. A granular composition according to claim 3, wherein the reactive dye is represented by the following formula (III),

(III)

wherein $D_1$ represents an organic dye residue having sulfo, $Y_1$ represents —$SO_2CH=CH_2$ or —$SO_2CH_2CH_2Z_1$ in which $Z_1$ represents a group capable of being split by the action of an alkali, and p represents a number of 1 to 3.

5. A granular composition according to claim 3, wherein the reactive dye is represented by the following formula (IV),

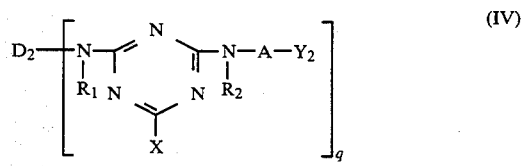
(IV)

wherein $D_2$ represents an organic dye residue having sulfo, $R_1$ and $R_2$ represent, independently of each other, hydrogen or an optionally substituted alkyl group, A represents an optionally substituted phenylene or naphthylene group, X represents a halogen atom, an optionally substituted pyridinio group or a group represented by the following formula:

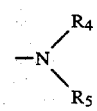

in which $R_4$ and $R_5$ represent, independently of each other, hydrogen or an optionally substituted alkyl, phenyl, benzyl or naphthyl group, $Y_2$ represents —$SO_2CH=CH_2$ or —$SO_2CH_2CH_2Z_2$ in which $Z_2$ represents a group capable of being split by the action of an alkali, and q represents a number of 1 to 3.

6. A granular composition according to claim 1, wherein the granulating auxiliary agent contains at least one emulsifier selected from the group consisting of compounds represented by the following formulas (4) and (5), the formula (4) being

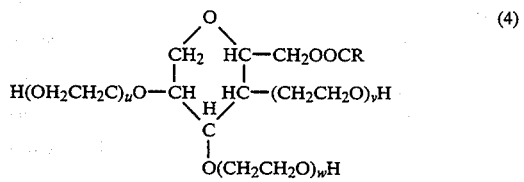
(4)

wherein R represents a saturated or unsaturated aliphatic group having 7 to 23 carbon atoms, and u, v and w represent numbers satisfying u+v+w = 10 to 30, and the formula (5) being

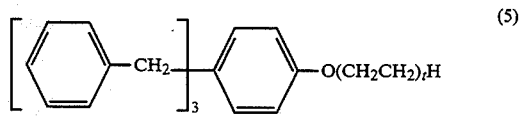
(5)

wherein t represents a number of 5 to 50.

7. A granular composition according to claim 1, wherein each granule has a particle size ranging from about 60 μm to about 1,000 μm.

8. A granular composition according to claim 1, wherein the composition has a bulk density of 0.4 to 1 g/cm³.

9. A process for producing a granular reactive dye composition of claim 1, which comprises subjecting an aqueous composition comprising a reactive dye and at least one granulating auxiliary agent as defined in claim 1 to drying granulation.

10. A process according to claim 9, wherein the drying granulation is carried out using a spray drier non-equipped or equipped with a fluidized bed.

11. A process for producing a granular reactive dye composition of claim 1, which comprises granulating a reactive dye in a powdery form using water or a binder and spraying an aqueous solution or suspension of a granulating auxiliary agent as defined in claim 1 to the formed granules, while subjecting the granules to drying.

12. A process according to claim 11, wherein said granulating, drying and spraying are carried out using a fluidized bed granulator non-equipped or equipped with rotating disk and agitator.

* * * * *